United States Patent [19]

Gomez

[11] Patent Number: 4,959,155

[45] Date of Patent: Sep. 25, 1990

[54] METHOD FOR THE PURIFICATION OF FLUIDS SUCH AS WATER, AQUEOUS FLUIDS AND FUEL FLUIDS

[76] Inventor: Luis Gomez, 299 Alhambra Circle, Suite 309, Coral Gables, Fla. 33134

[21] Appl. No.: 355,704

[22] Filed: May 23, 1989

[51] Int. Cl.$^5$ .................. B01D 15/00; C23F 11/18
[52] U.S. Cl. ............................. 210/687; 210/696; 422/19
[58] Field of Search ............ 210/687, 696, 749, 767, 210/918; 422/19

[56] References Cited

U.S. PATENT DOCUMENTS 4,247,398  1/1981  Mohri ................................ 210/222
4,429,665  2/1984  Brown ............................... 123/3

*Primary Examiner*—Ivars Cintins
*Attorney, Agent, or Firm*—Sughrue, Mion, Zinn, Macpeak & Seas

[57] ABSTRACT

There is described a method for the purification of fluids, such as water, aqueous fluids and fuel fluids, which comprises passing said fluids through a chamber usually inserted in the line of the aqueous fluid or the fuel fluid to be treated, within which there is located a solid body of an alloy material, having any suitable shape, preferably an elongated shape, in such a way that the external surfaces of said solid body of an alloy material are contacted with the water, aqueous fluid or fuel fluid flowing within the chamber, said solid body of an alloy material being fabricated from the metals nickel, zinc, aluminum, manganese and tin; and the alloy to carry out the method, made of the above metals.

6 Claims, No Drawings

METHOD FOR THE PURIFICATION OF FLUIDS SUCH AS WATER, AQUEOUS FLUIDS AND FUEL FLUIDS

FIELD OF THE INVENTION

The present invention refers to a method for the purification of fluids such as water, aqueous fluids and fuel fluids, and to an alloy to carry out the same, such fluids including, for instance, water, gasoline and diesel fuel, said purification treatment removing the impurities suspended in the fluids and improving the combustion characteristics of the fuels in the internal combustion engines.

BACKGROUND OF THE INVENTION

The aqueous fluids, such as water, usually contain metallic salts therein, said metallic salts, when in solution in aqueous fluids, are dissociated into cations and anions, causing hardness in the water, that is, they have a tendency to corrode the metallic tubing, particularly galvanized iron tubing, and the metallic containers through which the fluids flow and wherein the fluids are stored. In order to reduce the corrosive effect of the water or aqueous fluids flowing through the metallic tubing or contained in water tanks or condensation towers, etc., either the tubing or the container must be made corrosion resistant or the water must be made less corrosive. The stainless steel is corrosion resistant, but using it is often impractical or too costly. The removing of the metallic salts from the water will soften the water and will tend to make it less corrosive.

Once the impurities are forced to be suspended, these impurities may be removed by purging the system by means of the employment of a trap which can be also removed.

On the other hand, as it is well known, energy preservation and the pollution problem are atracting a big deal of attention, especially in the oil and oil based fuels areas. The automobile is one of the main consumers of oil in the form of gasoline, and a very significant energy preservation could be obtained by improving the fuel combustion procedure in the internal combustion engines. Therefore, a great effort is being directed to the output of a major amount of work of the automobile engine for the same amount of fuel consumed. A desirable sub-product of a more efficient combustion is that the engine exhaust emissions are generally cleaner because the fuel is more completely burnt.

Several attempts have been made in the past in order to eliminate the water or aqueous fluids impurities and in order to improve the fuel combustion characteristics, and they have included, in the case of water and aqueous fluids, the use of filters, ultrafiltration devices and chemical substances which are very costly.

Relating the object of improvement the combustion characteristics of the fuel, there have been used, among others, electrostatic fields applied through the fuel as it flows to the combustion chamber. On the other hand, it is known in the prior art, for example U.S. Pat. No. 4,429,665, describes a device and a method for treating fuel wherein the device comprises a housing through which the fuel passes, an elongated metallic bar within said housing for contact with the fuel, the metallic bar comprising an alloy made of nickel, zinc, copper, tin and silver, having a platinum coating, the method comprising the step of passing the fuel in contact with said alloy bar.

Finally, there are known a lot of devices made from different alloys, but these alloys contain lead as a component thereof, which represents an inconvenience because of the well known polluting and poisoning characteristics of lead.

OBJECTS OF THE INVENTION

Having in consideration the disadvantages of the intended systems of the prior art for purification of water and aqueous fluids and to improve the combustion characteristics of the fuel fluids, it is an object of the present invention to provide a method for the purification of said kind of fluids and the solid alloy material therefor, which reduce the problems associated with said fluids, in an optimum degree.

It is still another object of the invention, to provide a method for the purification of water and aqueous fluids, and an alloy therefor, of the above described kind, which eliminate the hardness of water and aqueous fluids, and which eliminate the problems of scale, rust and corrosion in the tubing.

Yet another object of the present invention is to provide a method for the purification of fuel fluids, which provides an improvement in the purity and combustion characterisitics thereof, reducing the emmission of polluting gases such as CO.

Additional objects and advantages of the invention will be set in the following description, which objects and advantages are partly obvious from the description and which may be partly comprehended by carrying out the invention.

BRIEF SUMMARY OF THE INVENTION

The method for treating water, aqueous fluids, and fuel fluids of the present invention for purifying them, comprises the steps of passing the fluid through a preferably elongated hollow chamber, provided with input and output ports to receive and unload the fluid to be treated, and contacting said fluid with a solid material body, preferably having an elongated shape, made of metal, formed from an alloy made of about 20 to 28% zinc, about 0.5–8% nickel, from about 0.005 to 2.5% aluminum, and from 7 to 15% manganese, with an addition of an amount of about 1.3 to 4.5% tin, said alloy also constituting part of the present invention, and being free of the polluting and poisoning lead that the prior art alloys contain.

When there is passed water or an aqueous fluid through the hollow, elongated chamber, in contact with the elongated metallic body alloy of the invention, within the chamber, there is obtained a purification of the water or aqueous fluid, such that it comes out from the chamber with the hardness reduced in such a degree that there is avoided the harmful scale, rust and corrosion in the tubing through which the water or aqueous fluids are conducted, or the containers containing them, suspending the salt, rust and the material forming the scale, and thus avoiding the reaction of such materials with the system containing them.

In swimming pools, water pools, water tanks, etc, the purification treatment by contact with the alloy of the present invention, reduces the use of chlorine 70 to 80%, consequently reducing the chlorine odor, the irritation to the eyes, and also reducing the fluid hardness and the formation of rust and scale in the conductors, pumps and filters though which the fluids pass.

On the other hand, the above said treatment increases the pH of the aqueous fluid or water, permiting an increased effectiveness of chlorine and avoiding the water turbidity.

When there is passed a fuel fluid in an internal combustion engine, through the hollow elongated chamber, in contact with the solid metallic elongated body alloy of the present invention, there is obtained a purification of the same, such that the polluting emissions are reduced about 65 to 75% owing to a better combustion of the fuel, resulting in lower maintenance costs of the engine, cleaner spark plugs, less tuning problems, improved injector perfomance and life, avoiding the knocking produced by lower octane gasolines, consequently resulting in fuel savings, pollution reduction by reducing the CO emissions, and increase in engine life.

BRIEF DESCRIPTION OF THE INVENTION

The novel aspects considered characteristic of the present invention are particularly set in the enclosed claims. The invention itself, however, both as to its organization and to its method of operation, together with additional objects and advantages thereof, will be better understood from the following description of a specific embodiment thereof.

DETAILED DESCRIPTION OF THE INVENTION

The method for the purification of fluids such as water, aqueous fluids, and fuel fluids of the present invention, comprises the steps of introducing said fluid through a hollow elongated chamber, and contacting said fluid with a solid material body constituted by an alloy made of about 20 to 28% zinc, about 0.5 to 8% nickel; from about 0.005 to 2.5% aluminum; and about 7 to 15% manganese, with an addition of about 1.3 to 4.5% tin, and extracting the purified fluid from the chamber.

The treatment chamber of the invention is provided with an inlet port receiving the water, aqueous fluid or fuel fluid and an outlet port unloading the same, in the purified condition. Said purification chamber may be conveniently inserted in a water, aqueous fluid or fuel fluid line, preferably as near as possible to the source providing the water, aqueous fluid or fuel fluid. For instance, for steam generators, the feed water is treated for purifying the same, on the intake line; for boilers, purification of the water must be carried out on the feed line; for cooling towers, the treatment of the present invention must be made in the same way as for the boilers, and for automobiles, for instance, the fuel purifying treatment of the present invention must be made between the fuel tank and the carburetor, preferably near the fuel tank.

The solid material body which is located within the chamber, may have an elongated bar-shaped body, provided with surfaces which are contacted with the fluid passing through the chamber, such as water, aqueous fluids and fuel fluids, received in the inlet of the chamber and unloaded through the outlet of the chamber, in a purified condition.

The invention also comprises the alloy from which the solid body is fabricated, said alloy comprising from about 20 to 28% zinc; from about 0.5 to 8% nickel; from about 0.005 to 2.5% aluminum; and from about 7 to 15% manganese, with an addition of about 1.3 to 4.5% tin.

Preferably, the alloy of the present invention comprises from about 23 to 27% zinc; from about 3 to 7% nickel; from about 0.25 to 1.5% aluminum; and from about 9 to 13% manganese, the tin addition preferably being from about 2 to 5% tin, all the above said percentages being given based on the total alloy.

Although there has been above described a specific embodiment of the present invention it must be understood that many modifications therein are possible. The present invention, therefore, must not be restricted except as necessary according to the prior art and to the spirit of the enclosed claims.

What is claimed is:

1. A method for the purification of a fluid selected from the group consisting of water, aqueous fluids, and fuel fluids, which comprises the steps of passing said fluid through a chamber provided with inlet and outlet ports to receive and unload the fluid to be treated, contacting said fluid with a solid material body made of an alloy constituted from about 20 to 28% zinc; from about 0.5 to 8% nickel; from about 0.005 to 2.5% aluminum; from about 7 to 15% manganese, and from about 1.3 to 4.5% tin, said percentages being based on the total alloy.

2. A method for the purification of a fluid according to claim 1, wherein the chamber is a hollow, elongated chamber and the alloy body within said chamber is an elongated bar-shaped body.

3. A method for the purification of a fluid selected from the group consisting of water, aqueous fluids and fuel fluids which comprises contacting said fluid with an alloy, wherein said alloy comprises from about 20 to 28% zinc; from about 0.5 to 8% nickel; from about 0.005 to 2.5% aluminum; from about 7 to 15% manganese; and from about 1.3 to 4.5% tin, said percentages being based on the total alloy.

4. A method for the purification of a fluid selected from the group consisting of water, aqueous fluids and fuel fluids which comprises contacting said fluid with an alloy, wherein said alloy comprises from about 23 to 27% zinc, from about 3 to 7% nickel, from about 0.25 to 1.5% aluminum; from about 9 to 15% manganese; and from about 2 to 5% tin, said percentages being based on the total alloy.

5. A method for the purification of a fluid selected from the group consisting of water, aqueous fluids and fuel fluids, which comprises the steps of passing said fluid through a chamber provided with inlet and outlet ports to receive and unload the fluid to be treated, contacting said fluid with a solid material body made of an alloy which comprises from 23 to 27% zinc; from about 3 to 7% nickel; from about 0.25 to 1.5% aluminum; from about 9 to 13% manganese; and from about 2 to 5% tin, said percentages being based on the total alloy.

6. A method for the purification of a fluid selected from the group consisting of water, aqueous fluids and fuel fluids, which comprises the steps of passing said fluid through a chamber provided with inlet and outlet ports to receive and unload the fluid to be treated, contacting said fluid with a solid material body made of an alloy which comprises from 23 to 27% zinc; from about 3 to 7% nickel; from about 0.25 to 1.5% aluminum; from about 9 to 13% manganese; and from about 2 to 5% tin, said percentages being based on the total alloy, wherein the chamber is a hollow, elongated chamber and the alloy body within said chamber is an elongated bar-shaped body.

* * * * *